United States Patent

Quisling

[15] 3,698,605
[45] Oct. 17, 1972

[54] DISCOVERY IN SOLUTION DISPENSERS

[72] Inventor: Sverre Quisling, 1240 Sherman Avenue, Madison, Wis. 53703

[22] Filed: March 26, 1971

[21] Appl. No.: 128,346

[52] U.S. Cl.................222/190, 23/267 R, 239/310
[51] Int. Cl. .............................................B01f 1/00
[58] Field of Search ......222/190; 239/310, 315, 316; 23/267 R, 267 D, 267 E, 267 F, 272.7, 272.8

[56] References Cited

UNITED STATES PATENTS

| | | | |
|---|---|---|---|
| 3,199,957 | 8/1965 | Vivion | 137/268 X |
| 2,693,805 | 11/1954 | Taplin | 222/190 X |
| 2,120,807 | 6/1938 | Kundel | 137/268 UX |
| 2,156,114 | 4/1939 | Gilford | 239/315 X |
| 3,249,261 | 5/1966 | Benediktson | 222/190 |

Primary Examiner—Robert B. Reeves
Assistant Examiner—Frederick R. Handren
Attorney—Joseph G. Werner, Theodore J. Long, John M. Winter and James A. Kemmeter

[57] ABSTRACT

Apparatus for dispensing solution of a substantially uniform concentration. The apparatus has a flow chamber with an inlet and an outlet. A liquid solvent is admitted to the flow chamber and washes over a soluble substance which is bonded to an insoluble carrier member restrained within the flow chamber for forming a solution to be dispensed.

4 Claims, 7 Drawing Figures

PATENTED OCT 17 1972 3,698,605
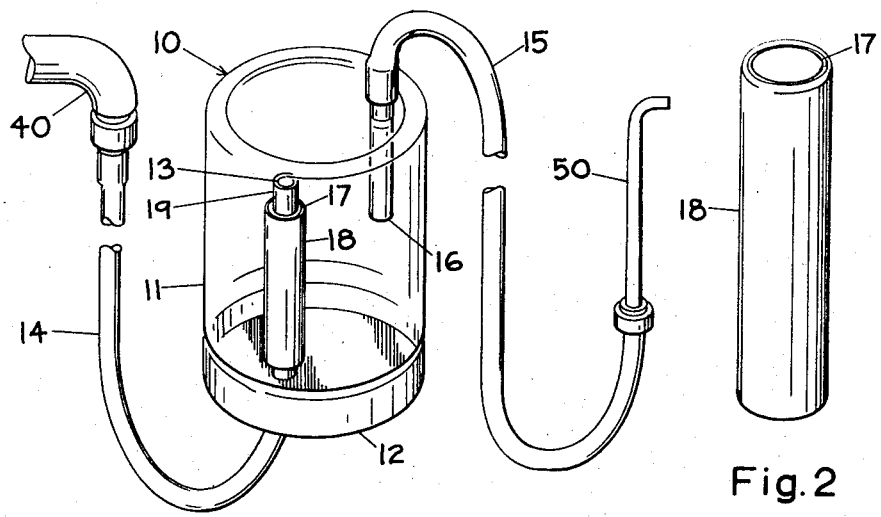
Fig. 1
Fig. 2
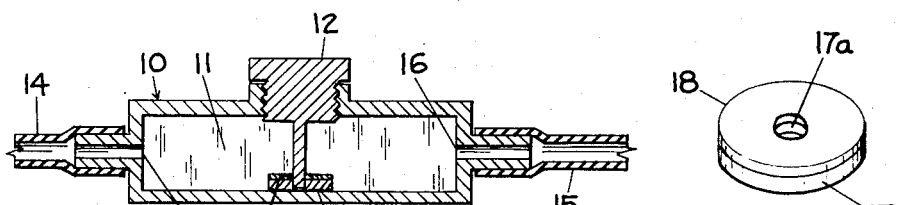
Fig. 3
Fig. 4
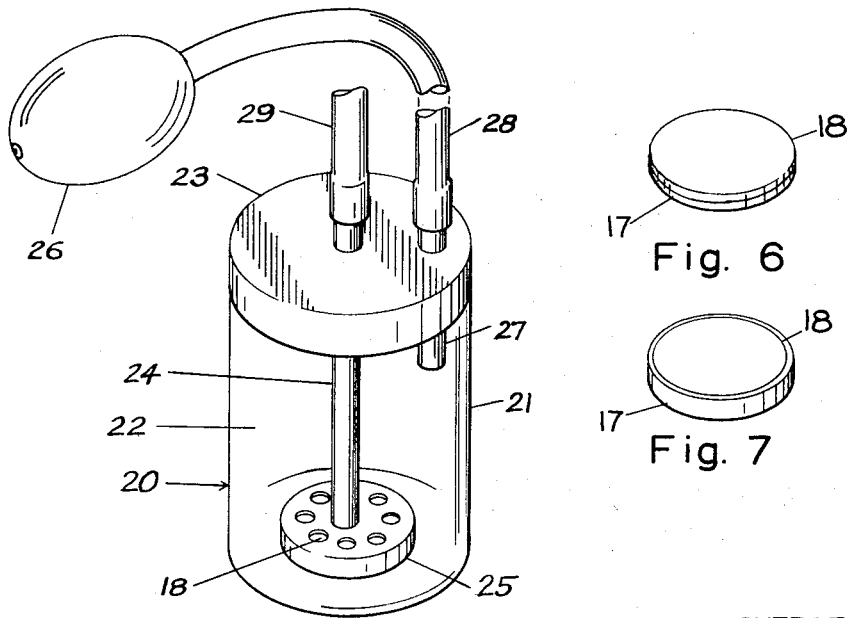
Fig. 5
Fig. 6
Fig. 7
INVENTOR.
SVERRE QUISLING

DISCOVERY IN SOLUTION DISPENSERS

BACKGROUND OF THE INVENTION

1. Field of the Invention

This invention pertains generally to devices for preparing solutions by washing a liquid solvent over a soluble tablet and then dispensing the solution.

2. Description of the Prior Art

Devices for dispensing a flow of solution at a substantially uniform specified concentration are particularly useful for medical therapeutic applications as well as many other purposes. Many prescribed medical treatments consist of washing a localized portion of the anatomy with chemicals of specified concentration for regulated periods of time. Some examples are antiseptic cleansing and removal of foreign material from the teeth and gums, treating infections of the throat, gums and the like, enemas and douches for treating infections and for removal of accumulations of body waste materials.

Typically solutions for such treatments are prepared by mixing measured portions of solvent and solute in a container. Although accurate solutions are prepared, the process is time consuming and bothersome and not well suited to he preparation of solutions to be applied in a continuous flow.

Various devices have been produced that interject soap, car wax, weed killer and the like directly into a liquid stream by having the liquid flow over a tablet of soluble material. As the material is washed by the liquid it is dissolved and carried along with the liquid flow.

These materials do not dissolve uniformly and do not therefore supply material at a constant rate. This is due in large part to the fact that the surface area of the soluble material is reduced considerably as the material is dissolved. Continued reduction of the surface area exposes less and less of the material to the flow of the liquid solvent which in turn reduces the rate of dissolution. The concentration of the solute in the solution is therefore substantially lessened as the material is progressively dissolved.

Also the soluble tablets tend to become very thin and break up when a substantial portion of their thickness has been dissolved away. Broken pieces of the tablet may clog the flow of liquid or may be washed into the liquid flow as undesirable chunks of undissolved matter. This is especially objectionable when the areas treated are sensitive areas such as the eyes, ears, nose and the like and where the strength of the solution must remain within fairly narrow limits. A solution which is too strong can cause irritation to sensitive areas or cause more serious damage while too weak a concentration will be ineffective.

SUMMARY OF THE INVENTION

I have invented an apparatus for making and dispensing solutions of a substantially uniform concentration. While the invention may take various forms it basically has a flow chamber with an inlet and an outlet, a soluble substance bonded to an insoluble carrier member which is restrained within the chamber so that liquid entering through the inlet washes over the soluble material producing a solution which is discharged through the outlet.

The soluble substance is bonded to the carrier member to prevent crumbling and breaking away of the substance when a substantial portion of it has been dissolved. Moreover coating the soluble substance on the insoluble carrier member exposes only a thin layer of it to the flow of liquid. As the soluble substance dissolves therefore, the surface area decreases only slightly. Since the surface area of the soluble material remains relatively constant, the concentration of the solution remains substantially uniform.

A restraining element holds the carrier member and the soluble substance bonded to it within the chamber. This prevents the substance from being bounced about by the flow of liquid through the chamber. It also prevents the soluble material from being washed out of the chamber by the liquid flow.

Other objects, features and advantages will become apparent from the following detailed description taken in conjunction with the accompanying drawings showing several embodiments for exemplification.

BRIEF DESCRIPTION OF THE DRAWINGS

FIG. 1 is a perspective view of one embodiment of my invention having the soluble substance coated on the outer surface of an insoluble tubular carrier member.

FIG. 2 is an enlarged perspective view of the tubular carrier member of FIG. 1.

FIG. 3 is a side elevation in section of a second embodiment of my invention having the soluble substance coated on the face of an insoluble flat annular carrier member.

FIG. 4 is an enlarged perspective view of the carrier member of FIG. 3.

FIG. 5 is a perspective view of a third embodiment having the soluble substance secured to the face of an insoluble flat disc carrier member contained within a cage in the flow chamber.

FIG. 6 is an enlarged perspective view of a disc carrier member for use with the embodiment shown in FIG. 5.

FIG. 7 is an enlarged perspective view of a dished carrier element for use with the embodiment shown in FIG. 5.

DESCRIPTION OF THE PREFERRED EMBODIMENTS SHOWN

Referring now more particularly to the drawings wherein like numerals refer to like parts throughout the several views, two embodiments of my solution dispenser are shown generally at 10, in FIGS. 1 and 3.

As depicted in these views, the solution dispenser 10 has a housing providing a cylindrical flow chamber 11. An inlet 13 admits liquid flowing through the tube 14 into the chamber 11. An outlet 16 discharges a flow of solution from the chamber 11 through another tube 15.

An insoluble carrier member 17 is positioned within the flow chamber 11. A soluble substance 18 is coated on the surface of the carrier member 17 in a thin layer. The surface area of the soluble substance 18 is quite large relative to its depth on the insoluble carrier member 17. As the soluble substance 18 dissolves, its total surface area decreases only slightly due to the reduction in the thickness of the layer. For example, the carrier member 17 of FIG. 2 is a tubular sleeve having the soluble substance 18 coated on its outer surface in a thin layer. If the sleeve were 2 ½ inches long with a radius of one-fourth inch and the soluble material were coated one thirty-second inch thick, the surface area of the soluble material exposed to solvent would vary from about 4.4 square inches initially to about 4.0 square inches when the soluble material is almost depleted. This is a variation of less than 10 percent during the useful life of the soluble substance on the carrier member.

Coating the soluble substance 18 on the insoluble carrier member 17 also provides support for the soluble substance to prevent it from crumbling after a substantial portion of its thickness has been dissolved away. This prevents chunks of soluble substance from breaking off and clogging or being washed out through the outlet 16.

The insoluble carrier member 17 and the soluble substance 18 are secured within the chamber 11 by a restraining element 19. This prevents the soluble substance 18 from being washed about within the chamber and being broken up. It also prevents discharge of a reduced soluble tablet through the outlet as in the prior art. The restraining element 19 may be secured to the chamber 11 in any appropriate manner. It is preferred, however, to attach it to a threaded cap 12. The insoluble carrier member 17 and the soluble substance 18 will then be conveniently exposed for replacement by simply unscrewing and removing the cap 12.

In operation the solution dispenser may be connected to a source of liquid such as the water tap 40 shown in FIG. 1. The liquid flows through the tube 14 into the chamber 11. The liquid in the chamber 11 washes over the surface of the soluble substance 18 coated on the carrier member 17 dissolving some of the soluble substance.

The rate at which the soluble substance will dissolve depends upon several factors: the rate of flow of liquid through the solution dispenser; the surface area of the soluble substance exposed to the liquid; the type of soluble material; and the substance, if any, used to bind the soluble substance.

A desired rate of liquid flow as well as the composition of the soluble substance are determined by the type of therapeutic treatment to be given or other use. For example, antibiotics such as penicillin and antiseptics such as iodine may be used to treat or guard against infection; analgesics such as oil of cloves may be used to relieve pain; and dental preparations such as fluorides may be used in treating the teeth and gums.

The surface area of the soluble substance is determined by the practical limitations of the size of the solution dispenser 10 and the length of time the substance should last before it is substantially all dissolved.

The remaining variable is the binder material if one is used. Soaps are used as fast dissolving binders. Various sugars dissolve somewhat slower. Gelatins dissolve slower yet and water soluble gums obtained form acacia trees dissolve slowest of all these binders.

As the soluble substance 18 dissolves it forms a solution with the liquid which is discharged as a flow through the outlet 16 and the tube 14. The tube 14 may be connected to a nozzle such as that shown at 50 in FIG. 1 for use in cleaning teeth and gums or it may be connected to any of various other types of nozzles for other therapeutic treatments well known in the medical field. It should also be understood that the apparatus has many applications outside the medical field such as car washing and waxing, weed spraying and the like.

FIGS. 1, 3 and 5 illustrate various embodiments of my invention. FIGS. 2, 4, 6 and 7 illustrate in greater detail the insoluble carrier members 17 and the soluble substances 18 coated thereon. More specifically FIGS. 1 and 2 illustrate the use of a tubular carrier member 17. The soluble substance 18 is coated to the outside surface of the carrier member 17. The restraining means 19 consists of a tube encircling the inlet 13 and attached to the cap 12. The carrier member 17 is placed over the tube thus frictionally securing the carrier member on the restraining member in the flow chamber 11.

FIGS. 3 and 4 illustrate the use of a flat annular carrier member 17. The soluble substance 18 is coated on one face of the carrier member 17. The restraining means 19 consists of a pin attached to the cap 12. When the cap 12 is screwed into place, the pin passes through the hole 17a frictionally holding the carrier member 17 in place in the flow chamber 11.

FIG. 5 shows still another embodiment of the dispenser apparatus at 20. In this embodiment, the liquid is introduced into the top of the housing 21 forming the flow chamber 22. A cover 23 closes the flow chamber. An outlet conduit 24 protrudes downwardly through the cover to a point adjacent the bottom of the chamber. A perforated cage 25 is suspended just above the bottom of the chamber to allow the liquid to pass into the cage through the bottom thereof and through the perforations therein. A hand pump in the form of an atomizer bulb 26 is attached to an air supply conduit 27 via tube 28 to provide air pressure in the chamber for dispensing solution through outlet conduit 24 and discharge tube 29.

A solid disc carrier member shown at 17 in FIG. 6 having soluble material 18 coated on one face may be utilized with this embodiment or the dished carrier member shown at 17 in FIG. 7 with soluble material 18 held therein may be used. In either case, the tablet is placed in the perforated cage with the soluble material 18 exposed upwardly through the perforations as shown in FIG. 5. When he hand atomizer bulb is squeezed, the air pressure in the chamber forces liquid from the chamber into the cage from the bottom and through the perforations and the liquid washes over the surface of the soluble material, dissolving same and carrying it upwardly through the outlet conduit 24 and discharge tube 29.

As will be noted from the tablet forms in FIGS. 6 and 7, the exposed surface area of the soluble material 18 supported by the insoluble carrier member 17 will remain substantially unchanged during dissolution of the material.

It is understood that my invention is not confined to the particular construction and arrangement of parts herein illustrated and described, but embraces all such modified forms thereof as come within the scope of the following claims.

I claim:

1. Apparatus for dispensing solution of substantially uniform concentration comprising in combination:
   a. a housing providing a flow chamber for liquid,
   b. an inlet in said housing for admitting liquid into said flow chamber,
   c. an insoluble tubular sleeve carrier member, d. means for restraining said tubular sleeve carrier member within said flow chamber comprising a protruding member extending into said flow chamber and receiving said tubular sleeve carrier member thereon,
e. a soluble substance bonded to the outside surface of said tubular sleeve carrier member for exposure to liquid admitted to said flow chamber for dissolution by the liquid, and
f. an outlet in said housing for discharging solution from said flow chamber.

2. Apparatus for dispensing solution of substantially uniform concentration comprising in combination:
 a. a housing providing a flow chamber for liquid,
 b. an inlet in said housing for admitting liquid into said flow chamber,
 c. an insoluble substantially flat annular carrier member,
 d. means for restraining said substantially flat annular carrier member within said flow chamber comprising a pin extending into said flow chamber and receiving said carrier member thereon,
 e. a soluble substance bonded to the face of said substantially flat annular carrier member for exposure to liquid admitted to said flow chamber for dissolution by the liquid, and
 f. an outlet in said housing for discharging solution from said flow chamber.

3. Apparatus for dispensing solution of substantially uniform concentration comprising in combination:
 a. a housing providing a flow chamber for liquid,
 b. an inlet in said housing for admitting liquid into said flow chamber,
 c. an insoluble disc carrier member,
 d. means for restraining said carrier member within said flow chamber comprising a perforated cage in said flow chamber encircling said disc carrier member,
 e. a soluble substance bonded to the face of said insoluble disc carrier member for exposure to liquid admitted to said flow chamber for dissolution by the liquid, and
 f. an outlet in said housing for discharging solution from said flow chamber.

4. Apparatus for dispensing solution of substantially uniform concentration comprising in combination:
 a. a housing providing a flow chamber for liquid,
 b. an inlet in said housing for admitting liquid into said flow chamber,
 c. an insoluble dished carrier member,
 d. means for restraining said carrier member within said flow chamber comprising a perforated cage and said flow chamber encircling said dished carrier member,
 e. a soluble substance bonded in said dished insoluble carrier member for exposure to liquid admitted to said chamber for dissolution by the liquid, and
 f. an outlet in said housing for discharging solution from said flow chamber.

* * * * *